(12) United States Patent
Chang et al.

(10) Patent No.: US 9,898,341 B2
(45) Date of Patent: Feb. 20, 2018

(54) ADJUSTABLE PRIORITY RATIOS FOR MULTIPLE TASK QUEUES

(71) Applicant: HGST Netherlands B.V., Amsterdam (NL)

(72) Inventors: Dar-Der Chang, San Jose, CA (US); Hsing Heng Hsieh, San Jose, CA (US); Charles Dominic Potter, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 15/052,946

(22) Filed: Feb. 25, 2016

(65) Prior Publication Data

US 2017/0249191 A1    Aug. 31, 2017

(51) Int. Cl.
G06F 9/46 (2006.01)
G06F 9/50 (2006.01)

(52) U.S. Cl.
CPC .................................. *G06F 9/5038* (2013.01)

(58) Field of Classification Search
None
See application file for complete search history.

(56) References Cited

U.S. PATENT DOCUMENTS

| | | | |
|---|---|---|---|
| 5,937,205 A | 8/1999 | Mattson et al. | |
| 6,839,804 B2 | 1/2005 | Don et al. | |
| 7,818,520 B2 | 10/2010 | Chen | |
| 7,849,044 B2 | 12/2010 | Nelken | |
| 7,929,562 B2 | 4/2011 | Petrovykh | |
| 8,347,295 B1 | 1/2013 | Robertson et al. | |
| 8,505,015 B2 | 8/2013 | Stehley | |
| 8,954,968 B1 | 2/2015 | Pohl et al. | |
| 2003/0177296 A1* | 9/2003 | Kurth | G06F 13/3625 710/244 |
| 2008/0222640 A1* | 9/2008 | Daly | G06F 9/4881 718/103 |
| 2008/0235696 A1* | 9/2008 | Yamamoto | G06F 9/4881 718/103 |
| 2009/0122702 A1* | 5/2009 | Chew | H04L 12/5695 370/235 |
| 2014/0278641 A1 | 9/2014 | Kleehammer et al. | |

OTHER PUBLICATIONS

Alistarh et al., "The SprayList: A Scalable Relaxed Priority Queue", PPoPP'15, Feb. 7-11, 2015, 10 pgs.

* cited by examiner

*Primary Examiner* — Sisley Kim
(74) *Attorney, Agent, or Firm* — Patterson + Sheridan, LLP

(57) ABSTRACT

In some examples, a method includes assigning, to each respective task queue of a plurality of task queues, a respective priority ratio based at least in part on a number of tasks in the respective task queue. The method further includes assigning, by a processor of a plurality of processors, respective tasks from the respective task queues to at least one processor of the plurality of processors in an order based at least in part on the respective priority ratio, wherein the respective priority ratio defines a relative frequency with which tasks from the respective task queue are assigned to the at leak one processor.

20 Claims, 6 Drawing Sheets

| 410A | RATIO (1:4) | Skip | Skip | Skip | Execute | Skip | Skip | Skip | Skip | Execute | Skip |
|---|---|---|---|---|---|---|---|---|---|---|---|
| 410B | RATIO (1:2) | Skip | Skip | Skip | Execute | Skip | Execute | Skip | Skip | Skip | Execute |
| 410C | RATIO (1:1) | Skip | Execute | Execute | Skip | Execute | Skip | Execute | Execute | Skip | Skip |
| 410D | RATIO (2:1) | Execute | Execute | Skip | Skip | Execute | Execute | Skip | Execute | Execute | Skip |
| 410E | RATIO (4:1) | Execute | Execute | Execute | Execute | Skip | Execute | Execute | Execute | Execute | Execute |

FIG. 4A

| | | | | | | | | | | |
|---|---|---|---|---|---|---|---|---|---|---|
| 420A | Q0 L1 (1:2) | Skip | Execute 2 | Skip | Skip | Execute 5 | Skip | Skip | Execute 9 | Skip | Execute 14 |
| 420B | Q1 L3 (2:1) | Execute 1 | Skip | Execute 4 | Execute 5 | Skip | Execute 7 | Execute 8 | Skip | Execute 11 | Skip |
| 420C | Q3 L0 (1:4) | Skip | Skip | Skip | Skip | Skip | Skip | Skip | Skip | Execute 12 | Skip |
| 420D | Q4 L2 (1:1) | Skip | Execute 3 | Skip | Skip | Execute 6 | Skip | Skip | Execute 10 | Execute 13 | Skip |

FIG. 4B

ADJUSTABLE PRIORITY RATIOS FOR MULTIPLE TASK QUEUES

TECHNICAL FIELD

This disclosure relates to using techniques implemented by a computing device to schedule tasks from a plurality of task queues.

BACKGROUND

A storage device, such as a hard disk drive (HDD) or a solid state drive (SSD), includes one or more processors, such as a central processing unit (CPU), that execute various tasks, such as receiving host commands, executing read and write operations to memory devices, performing maintenance operations (such as garbage collection or wear leveling), and the like. In some examples, the storage device may include multiple processors, such as a multi-core CPU, where each core effectively represents a different CPU. In a multiple processor environment, the storage device may perform multiple tasks simultaneously.

To control scheduling of tasks, a processor of the storage device utilizes a task queue. In some examples, if workload is heavy, the task queue may have multiple tasks waiting to be scheduled and completed. If the number of tasks in the task queue becomes too high, performance of the storage device may suffer due to delay in performing tasks.

SUMMARY

In some examples, the disclosure describes a method including assigning, to each respective task queue of a plurality of task queues, a respective priority ratio based at least in part on a number of tasks in the respective task queue. The method further includes assigning, by a processor of a plurality of processors, respective tasks from the respective task queues to at least one processor of the plurality of processors in an order based at least in part on the respective priority ratio. The respective priority ratio defines a relative frequency with which tasks from the respective task queues are assigned to the at least one processor.

In some examples, the disclosure describes a system including a memory storing a plurality of task queues, wherein each task queue of the plurality of task queues is associated with a respective priority ratio that is based at least in part on a number of tasks in the respective task queue. The system further includes a plurality of processors, where a first processor of the plurality of processors is configured to assign respective tasks from the respective task queues to at least one processor of the plurality of processors in an order based at least in part on the respective priority ratio. The respective priority ratio defines a relative frequency with which tasks from the respective task queues are assigned to the at least one processor.

In some examples, the disclosure describes a system comprising means for assigning, to each respective task queue of a plurality of task queues, a respective priority ratio based at least in part on a number of tasks in the respective task queue. The system comprises means for assigning respective tasks from the respective task queues to at least one processor of a plurality of processors in an order based at least in part on the respective priority ratio. The respective priority ratio defines a relative frequency with which tasks from the respective task queues are assigned to the at least one processor.

In some examples, the disclosure describes a computer-readable storage device comprising instructions that, when executed, configure one or more processors of a storage device to assign, to each respective task queue of a plurality of task queues, a respective priority ratio based at least in part on a number of tasks in the respective task queue. The computer-readable storage device further comprises instructions that, when executed, configure the one or more processors of the storage device to assign respective tasks from the respective task queues to at least one processor of a plurality of processors in an order based at least in part on the respective priority ratio. The respective priority ratio defines a relative frequency with which tasks from the respective task queues are assigned to the at least one processor.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A and 4B are conceptual diagrams illustrating an example plurality of priority ratios and an example assignment of tasks from a plurality of task queues to at least one processor, respectively, in accordance with some examples of this disclosure.

DETAILED DESCRIPTION

In general, this disclosure describes techniques implemented by a first processor of a storage device to assign tasks from a plurality of task queues to at least one processor based at least in part on a respective priority ratio associated with each respective task queue. In some examples, the first processor that assigns tasks may be different than the at least one processor to which the processor assigns tasks. In other examples, the first processor that assigns tasks may be one of the at least one processors. The respective priority ratio associated with each task queue may be determined based at least in part on a number of tasks in the respective task queue. Additionally, in some examples, the priority ratio may be based at least in part on a type of task associated with the respective task queue. The priority ratio may define a relative frequency with which the first processor assigns tasks from the respective task queues to at least one processor. In some examples, the respective task queue may be associated with a respective priority ratio based at least in part on the number of tasks in the respective task queue, and the respective priority ratio may be updated from time to time to adjust for the number of tasks in the respective task queue.

In some examples, the first processor may assign tasks from the respective task queues to the at least one processor by progressing through tasks associated with the respective task queues in a predetermined order in which the task queues are interleaved. The first processor may determine whether to send a task from a respective task queue to be executed by the at least one processor based on the priority ratio, which may be a ratio of execute indicators to skip indicators. In this way, when the priority ratio associated with a respective task queue is higher, the first processor assigns tasks from the respective task queue to the at least one processor more often than when the priority ratio associated with the respective task queue is lower. Further, assuming the priority ratio is greater than zero, the first processor continues to assign tasks from each respective task queue to the at least one processor.

In some examples, each processor of the at least one processor may be configured to perform tasks from each task queue. In this way, the first processor may more effectively balance the task load between the at least one processor compared to systems in which each processor of the at least one processor is dedicated to a particular task queue or type of task.

Figure 1:
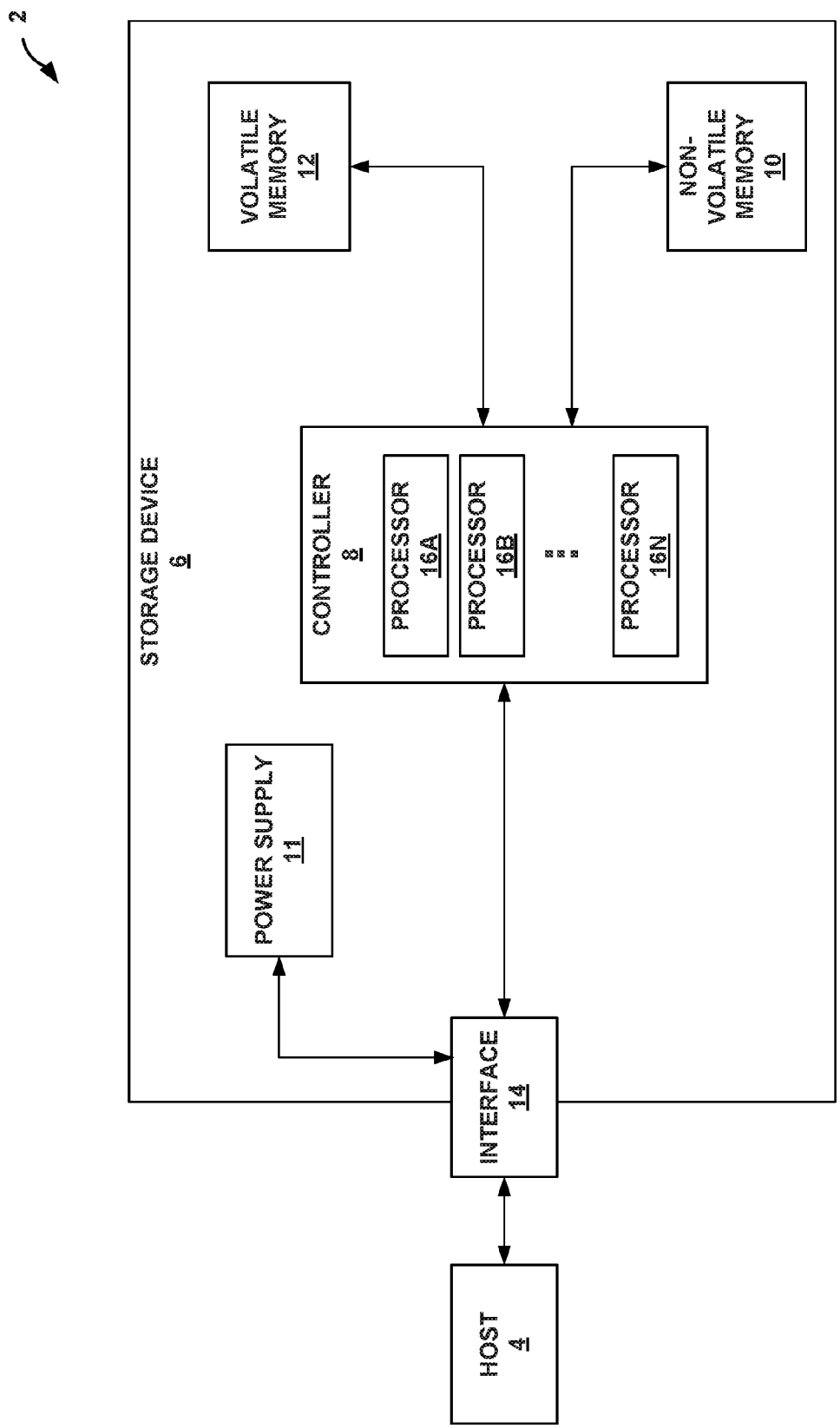
FIG. 1 is a conceptual and schematic block diagram illustrating an example storage environment in which a storage device may function as a storage device for a host device, in accordance with some examples of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array'. For instance, storage environment 2 may include a plurality of storages devices 6 configured as a redundant array of inexpensive/independent disks (RAID) that collectively function as a mass storage device for host device 4. Storage device 6 may be, for example, a solid state drive (SSD), a hard disk drive (HDD), a hybrid drive, which includes both solid state memory and magnetic media, or the like.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like. Typically, host device 4 comprises any device having a processor, which may refer to any form of hardware capable of processing data and may include a general purpose processing unit, such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like.

As illustrated in FIG. 1 storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" hard disk drive (EMU), 2.5" HDD, 1.8" HUD, peripheral component interconnect (PCI), PCI-extended (PCI-X), PCI. Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (DATA)), Fibre Channel, small computer system interface (SCSI), serially attached SCSI (SAS), peripheral component interconnect (PCI), PCI-express, or Non-Volatile Memory Express (NVMe), The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to temporarily store information. In some examples, controller 8 may use volatile memory 12 as a cache. For instance, controller 8 may store cached information in volatile memory 12 until the cached information is written to NVM 10. Volatile memory 12 may consume power received from power supply 11 to maintain the data stored in volatile memory 12. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 includes controller 8, which may manage one or more operations of storage device 6. For instance, controller 8 may manage the reading of data from and/or the writing of data to WM 10 or volatile memory 12. In some examples, controller 8 may manage the reading of data from and/or the writing of data to NVM 10 or volatile memory 12 by exchanging signals with NVM 10 or volatile memory 12. As discussed above, controller 8 may exchange signals with NVM 10 or volatile memory 12 in accordance with a communication protocol.

Controller 8 may include a plurality of processors 16A-16N (collectively, "processors 16"). Each of processors 16 may be configured to execute tasks. The tasks may be of different types, and, in some examples, each respective type of task may be stored in or associated with a respective task queue while waiting for execution by processors 16. The different types of tasks may include, for example, front end tasks, which may include receiving and interpreting instructions received from host device 4. Other types of tasks including caching; back-end tasks, which may include reading data from or writing data to NVM 10; housing-keeping, which may include garbage collection, wear leveling, TRIM, or the like; and system tasks. In some examples, each of processors 16 may be referred to as a compute unit, a processing unit, a core, or a central processing unit (CPU).

In accordance with examples of this disclosure, a first processor 16A may be configured to operate as a scheduler that schedules tasks for execution by at least one other of processors 16. First processor 16A may assign tasks from a plurality of task queues to at least one other processor of processors 16. As described above, each of the task queues may be associated with a task type.

In contrast to some other scheduling techniques, each task queue is associated with a respective priority ratio, and the priority ratio defines the frequency with which tasks from the respective task queue are scheduled by first processor 16A to be executed by the at least one processor of processors 16. The respective priority ratio for each task queue may be based at least in part on the number of tasks in the respective task queue. In this way, the respective priority ratios are reflective of a number of tasks in the respective task queues, and the frequency with which tasks from a task queue are assigned by first processor 16A for execution is based at least in part on the number of tasks in the task queue.

In some examples, the respective priority ratios may be updated from time to time, such that the respective priority ratios are reflective of a current or recent number of tasks in the respective task queues. In this way, the techniques described herein may facilitate auto prioritization of the respective task queues based at least in part on the number of tasks currently or recently in the task queue.

For example, first processor 16A may determine the respective priority ratio associated with each task queue based at least in part on a number of tasks in the respective task queue. In some examples, first processor 16A additionally may base the priority ratio on a type of task associated with the respective task queue. For example, front-end tasks may have a higher priority than house-keeping tasks or system tasks. The priority ratio may define a relative frequency with which first processor 16A assigns task from the respective task queues to the at least one other processor of processors 16. First processor 16A may update the respective priority ratio from time to time to adjust for the number of tasks in the respective task queue.

In some examples, first processor 16A may assign tasks from the respective task queues to the at least one other processor of processors 16 by progressing through tasks associated with the respective task queues in a predetermined order in which the task queues are interleaved. First processor 16A may determine whether to send a task from a respective task queue to be executed by at least one other processor of processors 16 based on the priority ratio of the respective task queue, which may be a ratio of execute indicators to skip indicators. In this way, when the priority ratio associated with a respective task queue is higher, first processor 16A assigns tasks from the respective task queue to the at least one other processor of processors 16 more often than when the priority ratio associated with the respective task queue is lower. Further, assuming the priority ratio is greater than zero, first processor 16A continues to assign tasks from each respective task queue to the at least one other processor of processors 16.

Figure 2:
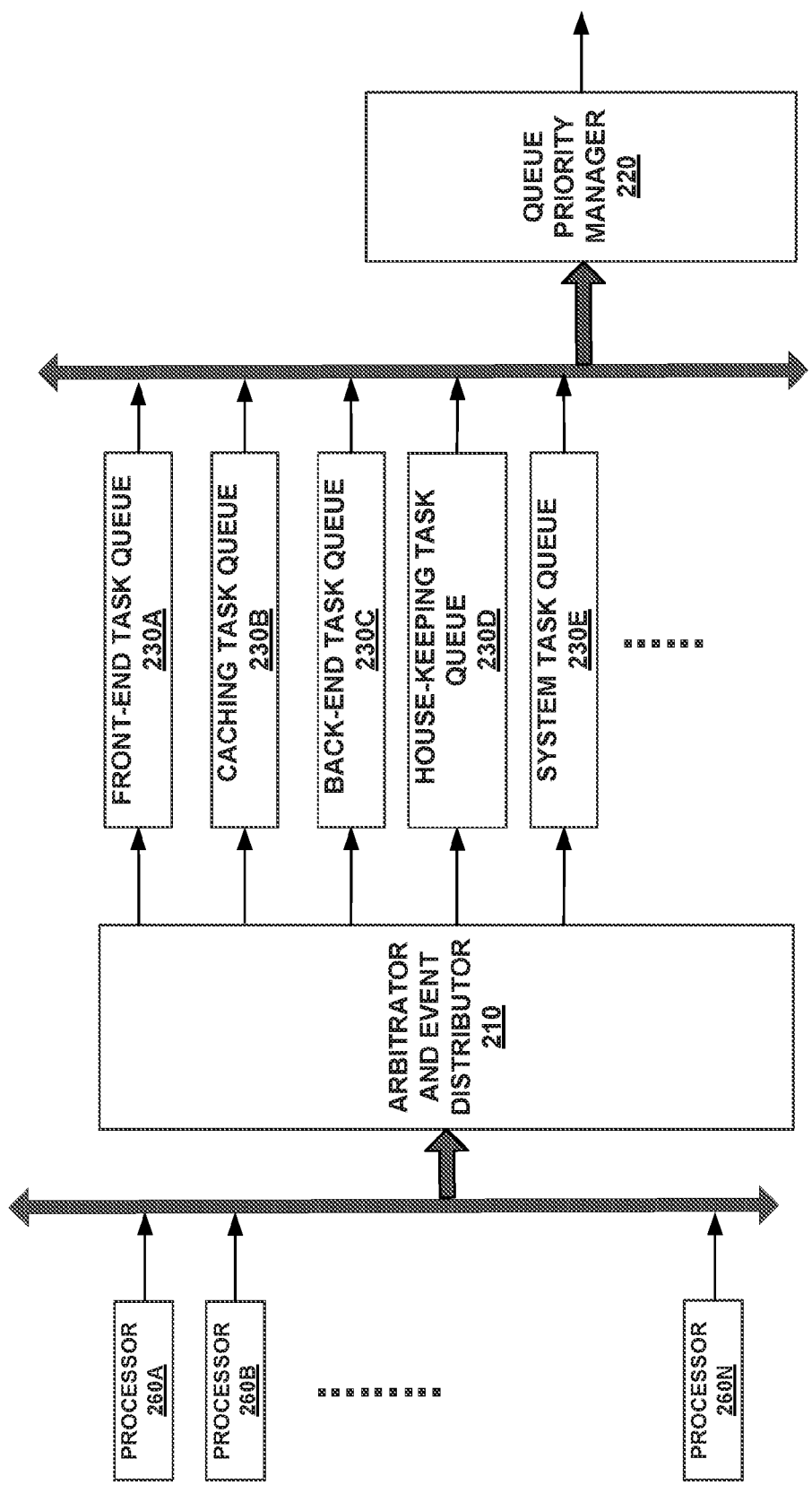
FIG. 2 is a conceptual block diagram illustrating an example flow of tasks through a system that implements an automatically prioritizing event queue, in accordance with some examples of this disclosure.

FIG. 2 is a conceptual block diagram illustrating a flow of tasks through a system that implements an automatically prioritizing event queue, in accordance with one or more techniques of this disclosure. FIG. 2 illustrates a system including a plurality of processors 260A-260N (collectively, "plurality of processors 260"), an arbitrator and event distributor 210, a plurality of task queues 230A-230E (collectively, "plurality of task queues 230"), and a queue priority manager 220. In some examples, plurality of processors 260 may correspond to plurality of processors 16A-16N in FIG. 1. As described above with respect to FIG. 1, each of processors 260 may include any form of hardware capable of processing data and may include a general purpose processing unit, such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like. The system of FIG. 2 may include any number of processors.

Although illustrated in FIG. 2 as a separate functional block, in some examples, one of plurality of processors 260 may include or may execute arbitrator and event distributor 210. In some examples, arbitrator and event distributor 210 may be implemented as a hardware unit of one of plurality of processors 260, while in other examples, arbitrator and event distributor 210 may be implemented in firmware or software executed by one of plurality of processors 260. Arbitrator and event distributor 210 may receive a message from one of plurality of processors 260 that includes a task (or event) type and a task (or event) pointer. The task type may indicate a general category of task, such as, for example, a front-end task (e.g., a task received from host 4 via interface 14 (FIG. 1), a cache task, a back-end task (e.g., a task related to reading data from or writing data to non-volatile memory 12 (FIG. 1)), a house-keeping task (e.g., a task related to garbage collection, wear leveling, or the like), a system task (e.g., a task related to internal operation of storage device 6), or the like. The task pointer may indicate a location of a memory or a cache at which data associated with the task is stored.

Arbitrator and event distributor 210 may receive the task type and the task indicator and assign the task to one of plurality of task queues 230 based at least in part on the task type. In some examples, each task type has an associated task queue. For example, as shown in FIG. 2, plurality of task queues 230 includes a front-end task queue 230A, a caching task queue 230B, a back-end task queue 230C, a house-keeping task queue 230I), and a system task queue 230E. In other examples, plurality of task queues 230 may include more or fewer task queues, may include task queues associated with other types of tasks, may include a task queue associated with two or more types of tasks, or the like. In some examples, plurality of task queues 230 may be stored in a memory associated with the processor of plurality of processors 260 that includes or executes arbitrator and event distributor 210.

Arbitrator and event distributor 210 may determine to which task queue of plurality of task queues 230 based at least in part on the tasks type. For example, the tasks type may be "front-end task" and arbitrator and event distributor 210 may assign the task to front-end task queue 230A. To assign a task to a task queue, arbitrator and event distributor 210 may cause the task pointer to be stored in the task queue. In some examples, arbitrator and event distributor 210 additionally may cause additional information associated with the task to be stored in the queue, such as cache information, if the task includes such information.

Queue priority manager 220 may control the assignment of tasks from plurality of task queues 230 to one of plurality of processors 260 for execution of the task. For example, as described above with respect to FIG. 1, the assignment of tasks from plurality of task queues 230 may be based at least in part on a priority ratio assigned to the respective plurality of task queues 230. Hence, queue priority manager 220 may assign tasks from plurality of task queues 230 based at least in part on respective priority ratios assigned to the respective task queues of plurality of task queues 230. In some examples, queue priority manager 220 may assign the respective priority ratio to each task queue of plurality of task queues 230 based at least in part on a number of tasks in the respective task queue. In some examples, queue priority manager 220 may be implemented as a hardware unit of one of plurality of processors 260 (e.g., the same processor of plurality of processors 260 that includes arbitrator and event distributor 210), while in other examples, queue priority manager 220 may be implemented in firmware or software executed by one of plurality of processors 260 (e.g., the same processor of plurality of processors 260 that executes arbitrator and event distributor 210).

Figure 3:
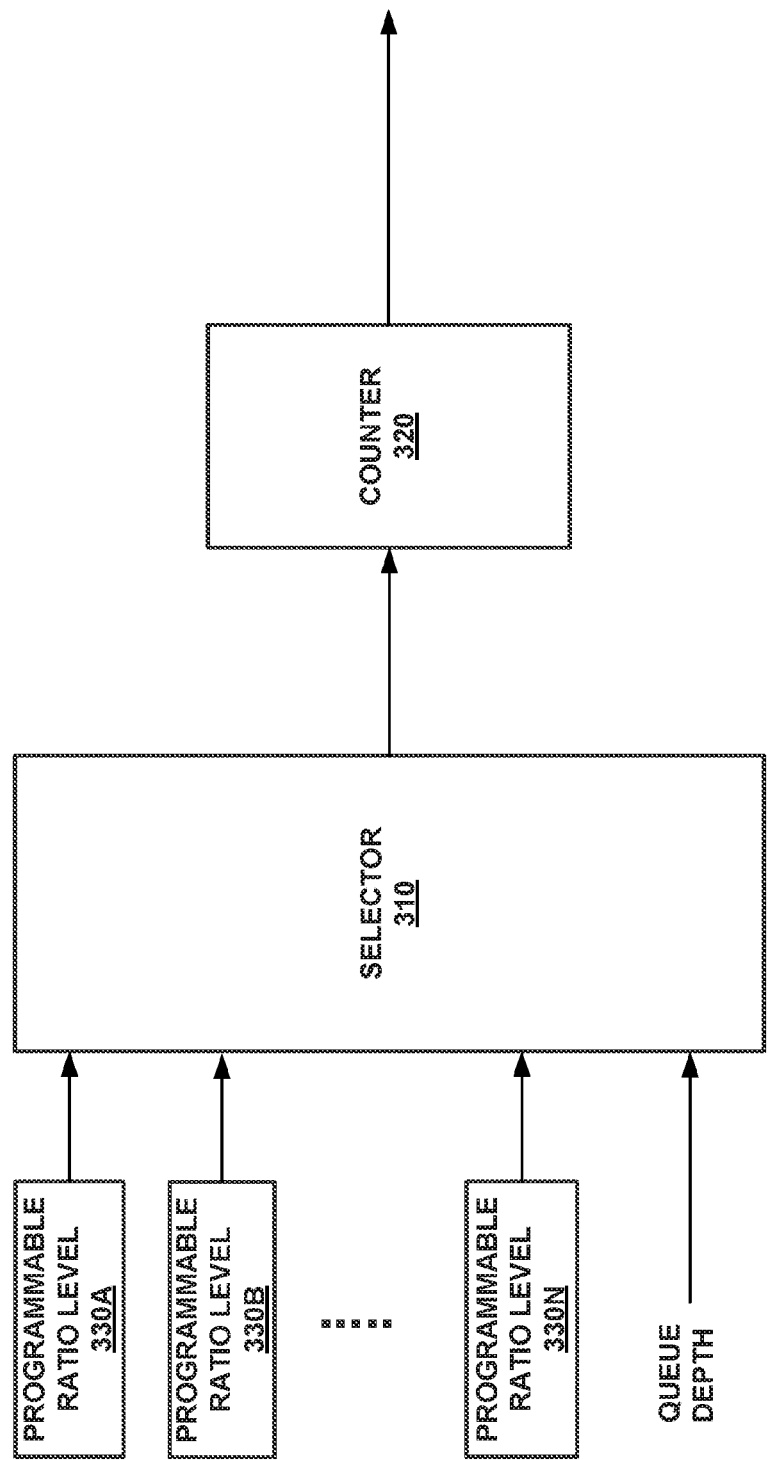
FIG. 3 is a conceptual and schematic block diagram illustrating an example multi-level programmable ratio unit, in accordance with some examples of this disclosure.
Figure 5:
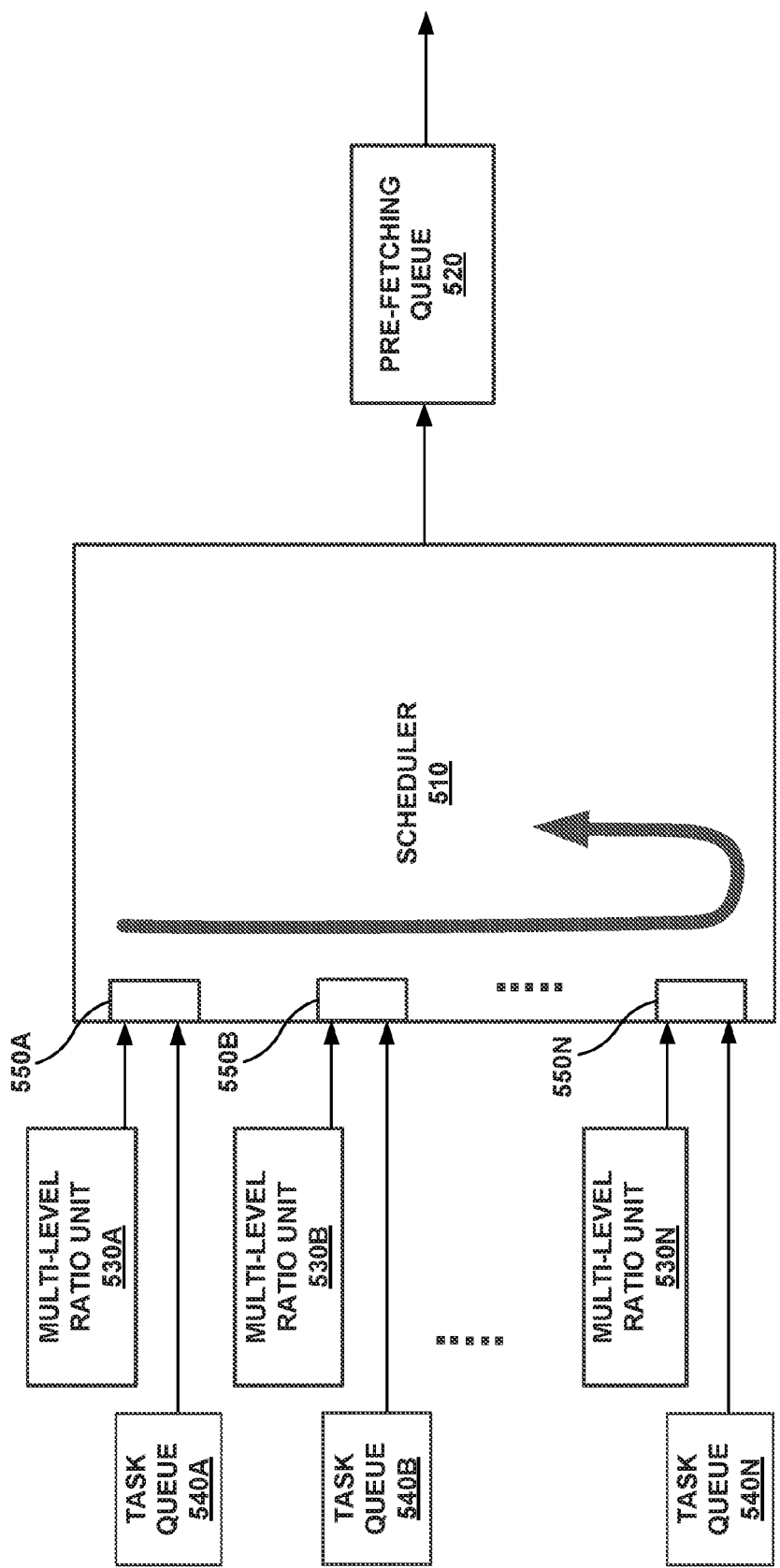
FIG. 5 is a conceptual and schematic block diagram illustrating an example task scheduler, in accordance with some examples of this disclosure.

FIGS. 3-5 are conceptual and schematic block diagrams that illustrate further detail of an example of queue priority manager 220. FIG. 3 is a conceptual and schematic block diagram illustrating an example multi-level programmable priority ratio unit, in accordance some examples of this disclosure. In some examples, the multi-level programmable priority ratio unit of FIG. 3 may be part of queue priority manager 220 illustrated in FIG. 2. Although FIG. 3 illustrates a single multi-level programmable priority ratio unit, in some examples, queue priority manager 220 may include a respective multi-level programmable priority ratio unit for each task queue of plurality of task queues 230. In some examples, the multi-level programmable priority ratio unit of FIG. 3 may be implemented as a hardware unit of one of plurality of processors 260 (e.g., the processor that includes queue priority manager 220), while in other examples, the multi-level programmable priority ratio unit of FIG. 3 may be implemented in firmware or software executed by one of plurality of processors 260 (e.g., the processor that includes queue priority manager 220). Selector 310 may be configured to assign a priority ratio to each task queue of plurality of task queues 230 (FIG. 2). For example, selector 310 may receive or store a plurality of programmable priority ratio levels 330A-330N (collectively, "plurality of programmable priority ratio levels 330"). As described above, the plurality of programmable priority ratio levels 330 may define the frequency with which tasks from the respective task queue associated with the priority ratio are scheduled by queue priority manager 220 to be executed by at least one processor of plurality of processors 260. FIG. 4A is a conceptual diagram illustrating an example plurality of priority ratios 410A-410E (collectively, "plurality of priority ratios 410").

As shown in FIG. 4A, in some examples, each priority ratio of plurality of priority ratios 410 may define a ratio of executes to skips. For example, a higher priority ratio may have a higher ratio of executes to skips, such that queue priority manager 220 assigns tasks from the task queue more often, e.g., with a higher frequency. Conversely, a lower priority ratio may have a lower ratio of executes to skips, such that queue priority manager 220 assigns tasks from the task queue less often, e.g., with a lower frequency.

FIG. 4A illustrates five example priority ratios. First priority ratio 410A defines a ratio of executes to skips of 1:4, 1 execute per 4 skips. In this way, first priority ratio 410A is a relatively low priority ratio. Second priority ratio 410B defines a ratio of executes to skips of 1:2, 1 execute per 2 skips. In this way, second priority ratio 410B is a relatively low priority ratio, but higher than first priority ratio 410A. Third priority ratio 410C defines a ratio of executes to skips of 1:1, 1 execute per 1 skip. In this way, third priority ratio 410C is a medium priority ratio. Fourth priority ratio 410D defines a ratio of executes to skips of 2:1, 2 executes per 1 skip. In this way, fourth priority ratio 410 is a relatively high priority ratio. Fifth priority ratio 410E defines a ratio of executes to skips of 4:1, 4 executes per 1 skip. In this way, fifth priority ratio 410E is a highest priority ratio of the priority ratios shown in FIG. 4A.

Although FIG. 4A illustrates five priority ratios, other priority ratios are possible and contemplated. In general, a priority ratio may include any ratio of executes to skips. 100401 Returning now to FIG. 3, selector 310 may receive an indication of the queue depth associated with a selected task queue of plurality of task queues 230 (FIG. 2). Selector 310 may be configured to assign a selected programmable priority ratio level of plurality of programmable priority ratio levels 330 to the selected task queue based at least in part on the queue depth of the selected task queue at the time selector 310 is assigning the priority ratio to the selected task queue. As used herein, the queue depth refers to the number of tasks associated with the selected task queue.

For example, selector 310 may be configured to assign a higher programmable priority ratio level (a higher ratio of executes to skips) in response to the selected task queue being associated with a higher queue depth. By assigning a higher programmable priority ratio level to the selected task queue, tasks from the selected task queue may be executed with a greater frequency, resulting in the queue depth decreasing over time, In some examples, each programmable priority ratio level of programmable priority ratio levels 330 may be associated with a range of queue depths. For example, if the selected queue depth is less than a first, lowest threshold queue depth, selector 310 may assign a first programmable priority ratio level 330A to the selected task queue, and the first programmable priority ratio level 330A may define the lowest priority ratio. As another example, if the selected queue depth is greater than the first, lowest threshold queue depth and less than a second, higher threshold queue depth, selector 310 may assign a second programmable priority ratio level 330B to the selected task queue, and the second programmable priority ratio level 330B may define a priority ratio higher than the lowest priority ratio. As a further example, if the selected queue depth is greater than the second, higher threshold queue depth and less than a third, yet higher threshold queue depth, selector 310 may assign a third programmable priority ratio level 330C to the selected task queue, and the third programmable priority ratio level 330C may define a priority ratio higher than the second programmable priority ratio level 330B. In this way, each programmable priority ratio level of plurality of programmable priority ratio levels 330 may be associated with a respective range of queue depths.

In some examples, in addition to the queue depth, selector 310 may base the assignment of the priority ratio to the selected task queue on the type of task queue. For example, a first task queue associated with a first type of task may have a different base priority than a second task queue associated with a second type of task. For example, front-end task queue 230A (FIG. 2) may have a higher base priority than system task queue 230E. By having a different base priority, selector 310 may assign a first programmable priority ratio level of plurality of programmable priority ratio levels 330 to a first task queue of plurality of task queues 230 and a second programmable priority ratio level of plurality of programmable priority ratio levels 330 to a second task queue of plurality of task queues 230 even if the first and second task queues a similar or same queue depth. In this way, certain tasks may be prioritized over other tasks, such as front-end tasks over system tasks, back-end tasks over house-keeping tasks, or the like.

Once selector assigns a programmable priority ratio level of plurality of programmable priority ratio levels 330 to the selected task queue, selector 310 may communicate the assigned programmable priority ratio level to counter 320. Counter 320 may count the number of executes, the number of skips, or both, to assist with scheduling of tasks from the selected task queue. For example, if the programmable priority ratio level is where $X_m$:1, is the number of executes, counter 320 may count from $X_0$ to $X_m$, advancing one number per execution cycle. For each execution cycle $X_0$ to $X_m$, counter 320 may output an "execute" message. For the next execution cycle after execution cycle $X_m$, counter 320 may output a "skip" message and reset the count. As another example, if the programmable priority ratio level is 1:$X_n$, where $X_n$ is the number of skips, counter 320 may count from $X_0$ to $X_n$, advancing one number per execution cycle. For each execution cycle $X_0$ to $X_n$, counter 320 may output a "skip" message. For the next execution cycle after execution cycle $X_n$, counter 320 may output an "execute" message and reset the count.

Queue priority manage 220 (FIG. 2) may additionally include a task scheduler, which may receive messages from counter 320 and schedule tasks based on the messages from counter 320. FIG. 5 is a conceptual and schematic block diagram illustrating an example task scheduler 510, in accordance with one or more examples of this disclosure.

In some examples, task scheduler 510 of FIG. 5 may be implemented as a hardware unit of one of plurality of processors 260 (e.g., the processor that includes queue priority manager 220), while in other examples, task scheduler 510 of FIG. 5 may be implemented in firmware or software executed by one of plurality of processors 260 (e.g., the processor that includes queue priority manager 220).

Task scheduler 510 may include a plurality of inputs 550A-550N (collectively, "plurality of inputs 550"), such as one input for each task queue of plurality of task queues 540A-540N (collectively, "plurality of task queues 540"), In sonic examples, plurality of task queues 540 may correspond to plurality of task queues 230 of FIG. 2. As shown in FIG. 5, each input of plurality of inputs 550 receives input from a respective task queue of plurality of task queues 540 and a respective multi-level programmable priority ratio unit of plurality of multi-level programmable priority ratio units 530A-530N (collectively, "plurality of multi-level programmable priority ratio units"). For example, the input from the respective multi-level programmable priority ratio unit may include an "execute" message or a "skip" message, and may be output by counter 320 based on the programmable priority ratio level assigned to the associated task queue by selector 310. The input from the respective task queue may include the task pointer and any additional information associated with the task and stored by the respective task queue.

In some examples, the inputs from the respective task queues 540 and associated respective multi-level programmable priority ratio units 530 may be arranged in a selected order. Scheduler 510 may be configured to sequentially evaluate the messages from the respective task queues 540 and associated respective multi-level programmable priority ratio units 530, such that scheduler 510 progresses through the task queues in a predetermined interleaved order. For example, as shown in FIG. 5, scheduler 510 is configured to evaluate the messages associated with a first task queue 540A first, then evaluate the messages associated with a second task queue 540B, et cetera, until scheduler 510 evaluates the messages associated with an Nth task queue 540N. Scheduler 510 may be configured to evaluate the messages associated with a first task queue 540A after evaluating the messages associated with an Nth task queue 540N.

In this way, scheduler 510 may be configured to evaluate the messages associated with the respective task queues 540 in a predetermined order, and to schedule a task from a respective task queue for execution by one of processors 260 (FIG. 2) based on the priority ratio associated with the respective task queue, as indicated by the messages received by scheduler 510 from the respective multi-level programmable priority ratio units 530.

FIG. 4B is a conceptual diagram illustrating assignment of tasks from a plurality of task queues to at least one processor, in accordance with some examples of this disclosure. FIG. 4B thus illustrates an example scheduling of tasks by scheduler 510. The example illustrated in FIG. 4B includes four task queues 420A-420B, each associated a respective programmable priority ratio. First task queue 420A is associated with a programmable priority ratio level of 1:2. FIG. 5 shows that, for first task queue 420A, counter 320 outputs "skip" messages for two execution cycles, followed by an "execute" message for the third execution cycle. Second task queue 420B has a programmable priority ratio level of 2:1. FIG. 5 shows that, for second task queue 420B, counter 320 outputs "execute" messages for two execution cycles, followed by a "skip" message for the third execution cycle. FIG. 5 also depicts third task queue 41200 being associated with a programmable priority ratio level of 1:4 and fourth task queue 420D being associated with a programmable priority ratio level of 1:4.

FIG. 5 also illustrates that task scheduler 510 progresses through the task queues in order from first task queue 420A to fourth task queue 420D. This can be represented in FIG. 4B as scheduler 510 progressing downward through each column, and through the columns from left to right. Each of the execute operations (assignment of a task to be executed) in FIG. 4B is labeled with a number to represent the order of assignment operations by scheduler. For example, in the first pass through plurality of task queues 420, scheduler 510 skips first task queue 420A, assigns a task from second task queue 420 to be executed by one of plurality of processors 260 (FIG. 2), skips third task queue 420C, and skips fourth task queue 420D. In the second pass through plurality of task queues 420, scheduler 510 skips first task queue 420A, assigns a task from second task queue 420B to be executed by one of plurality of processors 260 (FIG. 2), skips third task queue 420C, and assigns a task from fourth task queue 420D to be executed.

Scheduler 510 continues through plurality of task queues 420 in the predetermined order from first task queue 420A to fourth task queue 420D, and assigns tasks from the respective task queues based on the messages received from the respective counters of the respective multi-level programmable priority ratio units 530. Because a higher programmable priority ratio level results in a greater proportion of executes to skips for a task queue, scheduler 510 schedules tasks from a task queue associated with a higher programmable priority ratio level to be executed with a higher frequency than tasks from a task queue associated with a lower programmable priority ratio. In this way, because selector 310 may assign the priority ratio to the task queue based at least in part on the queue depth of the task queue, scheduler 510 may schedule tasks from a task queue with a greater queue depth more frequently, which may act to reduce the queue depth. This may be accomplished automatically based on the queue depth and predetermined relationships between queue depth and programmable priority ratio levels, as described with respect to FIG. 3. Further, this may be accomplished while scheduler 510 continues to assign tasks from other task queues to be executed.

As shown in FIG. 5, upon scheduling a task to be executed, scheduler 510 may communicate the task pointer and any other information associated with the task to a pre-fetching queue 520. The pre-fetching queue may queue the task pointers until one of processors 260 is free (e.g., idle) to execute the associated task.

In some examples, as described above, each processor of plurality of processors 260 may be capable of or configured to execute any type of task. Because of this, queue priority manager 220 (e.g., scheduler 510) may assign any task to any processor of plurality of processors 260. This may increase flexibility of load balancing across plurality of processors 260 compared to having each processor of plurality of processors 260 being dedicated to one type of task. For example, if host device 4 (FIG. 1) is communicating a large number of random write instructions to storage device 6, front-end task queue 230A may have a large queue depth, while back-end task queue 230C may have a relatively small queue depth, as the random write instructions may be combined before the data is written to non-volatile memory 10. By allowing queue priority manager 220 to assign tasks from front-end task queue 230A to any processor of plurality of processors 260, the techniques described herein may facilitate load balancing and higher performance.

Figure 6:
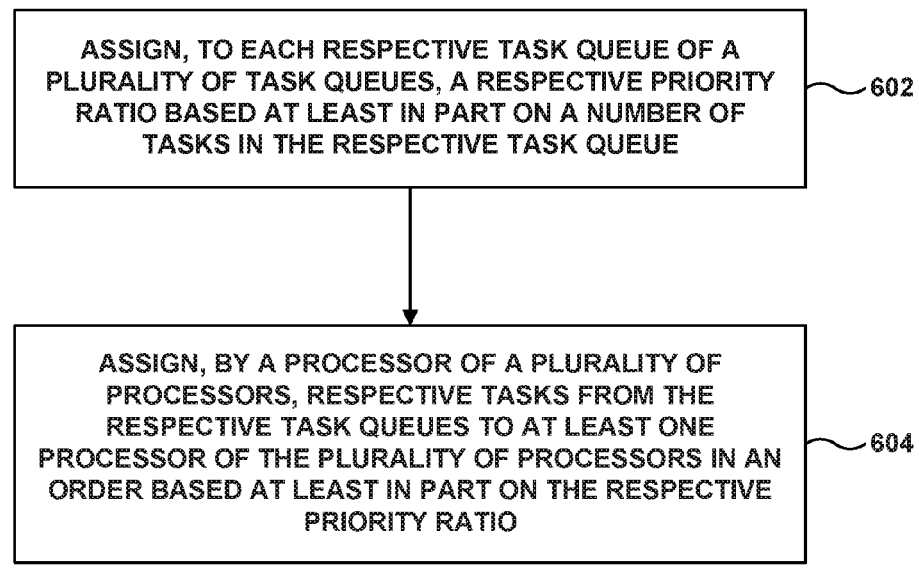
FIG. 6 is a flowchart illustrating an example technique for assigning tasks from a plurality of task queues to at least one processor, in accordance with some examples of this disclosure.

FIG. 6 is a flowchart illustrating an example technique for assigning tasks from task queues to at least one processor, in some aspects of this disclosure. The technique of FIG. 6 will be described with respect to FIGS. 2-5 for purposes of illustration only. In other examples, the technique of FIG. 6 may be performed by another system. The technique of FIG. 6 may include assigning, to each respective task queue of a plurality of task queues 230, a respective priority ratio based at least in part on a number of tasks in the respective task queue (602). In some examples, the priority ratio additionally may be based on a type of task associated with the respective task queue, such as a task associated with a host or a task associated with garbage collection. In some examples, selector 310 may assign the priority ratio to the task queue. The technique may further include assigning, by a processor of a plurality of processors 260, respective tasks from the respective task queues 230 to at least one processor of a plurality of processors 260 in an order based at least in part on the respective priority ratio (604). The priority ratio may define a relative frequency with which tasks from the respective task queues 230 are assigned to the at least one processor of plurality of processors 260.

The following examples may illustrate one or more of the techniques of this disclosure.

EXAMPLE 1

A method comprising: assigning, to each respective task queue of a plurality of task queues, a respective priority ratio based at least in part on a number of tasks in the respective task queue; and assigning, by a processor of a plurality of processors, respective tasks from the respective task queues to at least one processor of the plurality of processors in an order based at least in part on the respective priority ratio, wherein the respective priority ratio defines a relative frequency with which tasks from the respective task queues are assigned to the at least one processor.

EXAMPLE 2

The method of example 1, wherein assigning respective tasks from the respective task queues to the at least one processor comprises: progressing, by the processor, through tasks assigned to each respective task queue of the plurality of task queues in a predetermined interleaved order; and determining, by the processor, whether to assign a task from each respective task queue to the at least one processor based at least in part on the respective priority ratio associated with the respective task queue.

EXAMPLE 3

The method of example 1 or 2, wherein, wherein assigning to each respective task queue of the plurality of task queues, based at least in part on the number of tasks in the respective task queue, the respective priority ratio comprises: assigning, to each respective task queue of the plurality of task queues, based at least in part on the number of tasks in the respective task queue and a type of task associated with the respective task queue, the respective priority ratio.

EXAMPLE 4

The method of any one of examples 1 to 3, wherein, wherein assigning, to each respective task queue of the plurality of task queues, based at least in part on the number of tasks in the respective task queue and a type of task associated with the respective task queue, the respective priority ratio comprises: selecting, for each respective task queue, a priority ratio from a plurality of possible priority ratios assignable to the respective task queue, wherein each possible priority ratio of the plurality of possible priority ratios is associated with a respective range of numbers of tasks in the respective task queue.

EXAMPLE 5

The method of any one of examples 1 to 4, wherein, wherein the at least one processor is configured to handle tasks from any task queue of the plurality of task queues.

EXAMPLE 6

A system comprising: a memory storing a plurality of task queues, wherein each task queue of the plurality of task queues is associated with a priority ratio that is based at least in part on a number of tasks in the respective task queue; and a plurality of processors, wherein a first processor of the plurality of processors is configured to assign respective tasks from the respective task queues to at least one processor of the plurality of processors in an order based at least in part on the respective priority ratio, wherein the respective priority ratio defines a relative frequency with which tasks from the respective task queues are assigned to the at least one processor.

EXAMPLE 7

The system of example 6, wherein the first processor progresses through tasks assigned to each respective task queue of the plurality of task queues in a predetermined interleaved order; and the first processor determines whether to assign a task from each respective task queue to the at least one processor based at least in part on the priority ratio associated with the respective task queue.

EXAMPLE 8

The system of examples 6 or 7, wherein the respective priority ratio is based at least in part on the number of tasks in the respective task queue and a type of task associated with the respective task queue.

EXAMPLE 9

The system of any one of examples 6 to 8, wherein each respective task queue has a plurality of possible priority ratios associated with the respective task queue, and wherein each possible priority ratio of the plurality of possible priority ratios is associated with a respective range of numbers of tasks in the respective task queue.

EXAMPLE 10

The system of any one of examples 6 to 9, wherein the at least one processor is configured to handle tasks from any task queue of the plurality of task queues.

EXAMPLE 11

A system comprising: means for assigning, to each respective task queue of a plurality of task queues, a respective priority ratio based at least in part on a number of tasks in the respective task queue; and means for assigning respective tasks from the respective task queues to at least one processor of a plurality of processors in an order based at least in part on the respective priority ratio, wherein the respective priority ratio defines a relative frequency with which tasks from the respective task queues are assigned to the at least one processor.

EXAMPLE 12

The system of example 11, wherein the means for assigning respective tasks from the respective task queues to the at least one processor comprises: means for progressing through tasks assigned to each respective task queue of the plurality of task queues in a predetermined interleaved order; and means for determining whether to assign a task from each respective task queue to the at least one processor based at least in part on the priority ratio associated with the respective task queue.

EXAMPLE 13

The system of example 11 or 12, wherein the respective priority ratio is based at least in part on the number of tasks in the respective task queue and a type of task associated with the respective task queue.

EXAMPLE 14

The system of any one of examples 11 to 13, wherein each respective task queue has a plurality of possible priority ratios associated with the respective task queue, and wherein each possible priority ratio of the plurality of possible priority ratios is associated with a respective range of numbers of tasks in the respective task queue.

EXAMPLE 15

The system of any one of examples 11 to 14, wherein the at least one processor is configured to handle tasks from any task queue of the plurality of task queues.

EXAMPLE 16

A computer-readable storage device comprising instructions that, when executed, configure one or more processors of a storage device to assign, to each respective task queue of a plurality of task queues, a respective priority ratio based at least in part on a number of tasks in the respective task queue; and assign respective tasks from the respective task queues to at least one processor of a plurality of processors in an order based at least in part on the respective priority ratio, wherein the respective priority ratio defines a relative frequency with which tasks from the respective task queues are assigned to the at least one processor.

EXAMPLE 17

The computer-readable storage medium of example 16, further including instructions that, when executed, cause the one or more processors to perform the method of any one of examples 2 to 5.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure, In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
  assigning, to each respective task queue of a plurality of task queues, a respective priority ratio based at least in part on a number of tasks in the respective task queue; and
  assigning, by a processor of a plurality of processors, respective tasks from the respective task queues to at least one processor of the plurality of processors in an order based at least in part on the respective priority ratio, wherein the respective priority ratio defines a relative frequency with which tasks from the respective task queues are assigned to the at least one processor, wherein the respective priority ratio comprises a ratio of a number of tasks to execute to a number of tasks to skip, and wherein the respective priority ratio comprises a plurality of programmable priority ratio levels, wherein each programmable priority ratio level of the plurality of programmable priority ratio levels is associated with a range of queue depths that defines a frequency with which tasks from the respective task queue associated with the respective priority ratio are scheduled.

2. The method of claim 1, wherein assigning respective tasks from the respective task queues to the at least one processor comprises:
  progressing, by the processor, through tasks assigned to each respective task queue of the plurality of task queues in a predetermined interleaved order; and
  determining, by the processor, whether to assign a task from each respective task queue to the at least one processor based at least in part on the respective priority ratio associated with the respective task queue.

3. The method of claim 1, wherein assigning, to each respective task queue of the plurality of task queues, based at least in part on the number of tasks in the respective task queue, the respective priority ratio comprises:
  assigning, to each respective task queue of the plurality of task queues, based at least in part on the number of tasks in the respective task queue and a type of task associated with the respective task queue, the respective priority ratio.

4. The method of claim 1, wherein assigning, to each respective task queue of the plurality of task queues, based at least in part on the number of tasks in the respective task queue, the respective priority ratio comprises:
  selecting, for each respective task queue, a priority ratio from a plurality of possible priority ratios assignable to the respective task queue, wherein each possible priority ratio of the plurality of possible priority ratios is associated with a respective range of numbers of tasks in the respective task queue.

5. The method of claim 1, wherein the at least one processor is configured to handle tasks from any task queue of the plurality of task queues.

6. A system comprising:
  a memory storing a plurality of task queues, wherein each task queue of the plurality of task queues is associated with a respective priority ratio that is based at least in part on a number of tasks in the respective task queue; and
  a plurality of processors, wherein a first processor of the plurality of processors is configured to assign respective tasks from the respective task queues to at least one processor of the plurality of processors in an order based at least in part on the respective priority ratio, wherein the respective priority ratio defines a relative frequency with which tasks from the respective task queues are assigned to the at least one processor, wherein the respective priority ratio comprises a ratio of a number of tasks to execute to a number of tasks to skip, and wherein the respective priority ratio comprises a plurality of programmable priority ratio levels, wherein each programmable priority ratio level of the plurality of programmable priority ratio levels is associated with a range of queue depths that defines a frequency with which tasks from the respective task queue associated with the respective priority ratio are scheduled.

7. The system of claim 6, wherein:
  the first processor progresses through tasks assigned to each respective task queue of the plurality of task queues in a predetermined interleaved order; and
  the first processor determines whether to assign a task from each respective task queue to the at least one processor based at least in part on the priority ratio associated with the respective task queue.

8. The system of claim 6, wherein the respective priority ratio is based at least in part on the number of tasks in the respective task queue and a type of task associated with the respective task queue.

9. The system of claim 6, wherein each respective task queue has a plurality of possible priority ratios associated with the respective task queue, and wherein each possible priority ratio of the plurality of possible priority ratios is associated with a respective range of numbers of tasks in the respective task queue.

10. The system of claim 6, wherein the at least one processor is configured to handle tasks from any task queue of the plurality of task queues.

11. A system comprising:
means for assigning, to each respective task queue of a plurality of task queues, a respective priority ratio based at least in part on a number of tasks in the respective task queue; and
means for assigning respective tasks from the respective task queues to at least one processor of a plurality of processors in an order based at least in part on the respective priority ratio, wherein the respective priority ratio defines a relative frequency with which tasks from the respective task queues are assigned to the at least one processor, wherein the respective priority ratio comprises a ratio of a number of tasks to execute to a number of tasks to skip, and wherein the respective priority ratio comprises a plurality of programmable priority ratio levels, wherein each programmable priority ratio level of the plurality of programmable priority ratio levels is associated with a range of queue depths that defines a frequency with which tasks from the respective task queue associated with the respective priority ratio are scheduled.

12. The system of claim 11, wherein the means for assigning respective tasks from the respective task queues to the at least one processor comprises:
means for progressing through tasks assigned to each respective task queue of the plurality of task queues in a predetermined interleaved order; and
means for determining whether to assign a task from each respective task queue to the at least one processor based at least in part on the priority ratio associated with the respective task queue.

13. The system of claim 11, wherein the respective priority ratio is based at least in part on the number of tasks in the respective task queue and a type of task associated with the respective task queue.

14. The system of claim 11, wherein each respective task queue has a plurality of possible priority ratios associated with the respective task queue, and wherein each possible priority ratio of the plurality of possible priority ratios is associated with a respective range of numbers of tasks in the respective task queue.

15. The system of claim 11, wherein the at least one processor is configured to handle tasks from any task queue of the plurality of task queues.

16. A non-transitory computer-readable storage device comprising instructions that, when executed, configure one or more processors of a storage device to:
assign, to each respective task queue of a plurality of task queues, a respective priority ratio based at least in part on a number of tasks in the respective task queue; and
assign respective tasks from the respective task queues to at least one processor of a plurality of processors in an order based at least in part on the respective priority ratio, wherein the respective priority ratio defines a relative frequency with which tasks from the respective task queues are assigned to the at least one processor, wherein the respective priority ratio comprises a ratio of a number of tasks to execute to a number of tasks to skip, and wherein the respective priority ratio comprises a plurality of programmable priority ratio levels, wherein each programmable priority ratio level of the plurality of programmable priority ratio levels is associated with a range of queue depths that defines a frequency with which tasks from the respective task queue associated with the respective priority ratio are scheduled.

17. The non-transitory computer-readable storage device of claim 16, wherein the instructions that, when executed, configure the one or more processors of a storage device to assign respective tasks from the respective task queues to at least one processor comprise:
instructions that, when executed, configure the one or more processors of a storage device to progress through tasks assigned to each respective task queue of the plurality of task queues in a predetermined interleaved order; and
instructions that, when executed, configure the one or more processors of a storage device to determine whether to assign a task from each respective task queue to the at least one processor based at least in part on the priority ratio associated with the respective task queue.

18. The non-transitory computer-readable storage device of claim 16, wherein the instructions that, when executed, configure the one or more processors of a storage device to assign, to each respective task queue of the plurality of task queues, based at least in part on the number of tasks in the respective task queue, a respective priority ratio comprise:
instructions that, when executed, configure the one or more processors of a storage device to assign, to each respective task queue of the plurality of task queues, based at least in part on the number of tasks in the respective task queue and a type of task associated with the respective task queue, the respective priority ratio.

19. The non-transitory computer-readable storage device of claim 16, wherein the instructions that, when executed, configure the one or more processors of a storage device to assign, to each respective task queue of the plurality of task queues, based at least in part on the number of tasks in the respective task queue, a respective priority ratio comprise:
instructions that, when executed, configure the one or more processors of a storage device to select, for each respective task queue, a priority ratio from a plurality of possible priority ratios assignable to the respective task queue, wherein each possible priority ratio of the plurality of possible priority ratios is associated with a respective range of numbers of tasks in the respective task queue.

20. The non-transitory computer-readable storage device of claim 16, wherein the at least one processor is configured to handle tasks from any task queue of the plurality of task queues.

* * * * *